United States Patent [19]
Roberts

[11] 3,965,630
[45] June 29, 1976

[54] PRESTRESSED CONCRETE BOILER CLOSURE

[75] Inventor: Anthony Charles Roberts, Leicester, England

[73] Assignee: Taylor Woodrow Construction, Limited, Southall, England

[22] Filed: Nov. 19, 1974

[21] Appl. No.: 525,114

[52] U.S. Cl................ 52/224; 52/249; 220/3; 138/89; 52/726
[51] Int. Cl.² ............ E04C 3/22; E04C 5/08
[58] Field of Search........... 52/224, 249, 19–21, 52/726; 220/3, 325; 138/89, 89.3, 176, DIG. 5

[56] References Cited
UNITED STATES PATENTS

| | | |
|---|---|---|
| 3,128,001 | 4/1964 | Schmitz ............................ 220/3 |
| 3,568,385 | 3/1971 | Cruset et al. ..................... 220/3 |
| 3,713,459 | 1/1973 | McIver et al. ..................... 52/224 |
| 3,733,760 | 5/1973 | Koerner ........................... 52/224 |
| 3,841,035 | 10/1974 | Amtmann ......................... 52/21 |

FOREIGN PATENTS OR APPLICATIONS

| | | |
|---|---|---|
| 181,412 | 3/1955 | Austria ............................ 52/224 |
| 423,919 | 3/1967 | Switzerland ..................... 52/21 |

Primary Examiner—Frank L. Abbott
Assistant Examiner—James L. Ridgill, Jr.
Attorney, Agent, or Firm—Haseltine, Lake & Waters

[57] ABSTRACT

A prestressed concrete container having a chamber therein and a removable concrete member closing the chamber and held in its chamber-closing position by primary and secondary hold-down means each comprising members held fast with the concrete of the container and with the secondary hold-down members passing through the concrete of the closure member.

7 Claims, 1 Drawing Figure

U.S. Patent   June 29, 1976   3,965,630
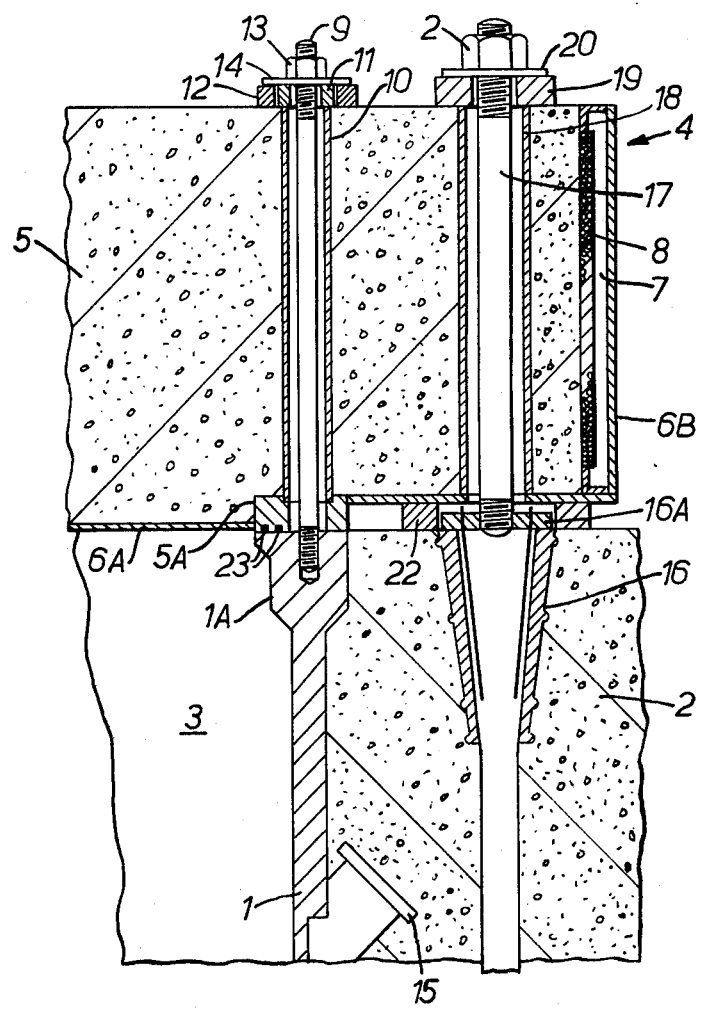

PRESTRESSED CONCRETE BOILER CLOSURE

This invention relates to vessels and is in particular concerned with a vessel that is to house a nuclear reactor which can be a boiling water reactor, a high temperature reactor or a fast breeder reactor which is liquid metal or gas cooled. For such use the vessel is required to be able to contain fluids under high pressure, by which is meant in the range of 400 to 12,000 lb/sq.in.

According to the present invention there is provided a vessel comprising a prestressed concrete container having a chamber therein, and a removable closure member closing the chamber, said member being formed of concrete and being held in its chamber-closing position by primary and secondary hold-down means; each of said hold-down means comprising members held fast with the concrete of the container and with the secondary hold-dwon members passing through the concrete of the closure member.

For a better understanding of the invention and to show how the same may be carried into effect, reference will now be made, by way of example, to the accompanying drawing, in which the single FIGURE is a cross-sectional view of a detail of a vessel that can be used for housing a nuclear reactor.

The vessel of the FIGURE has an inner cylindrical metal liner 1 housed in an outer prestressed concrete container 2. The chamber 3 within the liner 1, which houses the nuclear reactor, is closed by a closure member 4, the main body of which is formed by a concrete disc 5 of greater diameter than the chamber 3. A steel plate 6A forms an end face of this disc 5 where it covers the end of the chamber 3. The major part of the remainder of the lower (in the FIGURE) face of the disc 5, and the periphery of the disc 5, is contained within a steel cup 6B, there being an annular cavity 7 between the peripheral face of the disc 5 and the opposing inner face of the cup 6B.

The concrete disc 5 has either active or passive prestress or both active and passive prestress applied to it by means of layers of steel wires 8 wound around its peripheral face and hence contained within the cavity 7. Active prestress is applied by winding-on layers of wires 8 while subjecting them to tension such that substantial stress is positively applied to the disc 5. Passive prestress is applied by winding-on layers of wires 8 at a tension only just sufficient to ensure the desired layered configuration. The disc 5 is held on the vessel to close the chamber 3 by primary hold-down members, and also by secondary hold-down members intended to remain effective in the event that the primary hold-down members should fail.

The primary hold-down members comprise a ring of studs 9 passed through tubes 10 from the face of the disc 5 remote from the chamber 3 and screwed into tapped holes in a flange 1A around the top of the liner 1. Adjacent to flange 1A the studs 9 pass through holes in a circular bearing plate 5A mounted around a shoulder of the disc 5 and into which plate one end of each tube 10 is socketed. At its other end each tube 10 is flush with the surface of the disc 5 and is surmounted by a collar 11 that is a clearance fit in a corresponding hole in a further circular bearing plate 12. Beyond each collar 11 a nut 13 and a washer 14 are mounted on each stud 10. The primary hold-down load is applied by stressing the studs 9 and running down the nuts 13, the load being transferred to the liner flange 1A mainly via the collars 11 and the tubes 10, the tubes not being bonded to the concrete of the disc 5, so that only a small proportion of this load is transferred to the concrete of the disc 5. Thus prestress losses in the studs 9 due to concrete creep are minimised. The collars 11 project clear of the bearing plate 12 by a predetermined extent to enable load sharing to take place between the individual sets of components 10, 11, 13 and 14. Anchors 15 serve to anchor the liner 1 in the container concrete. The primary hold-down load applied to the studs 9 acts against the liner flange 1A giving a predetermined load across seals 23.

Tendons 16 provided in conventional manner for prestressing the concrete of the container 2 are effectively extended to the upper (in the FIGURE) surface of the disc 5 by the secondary hold-down members. To this end, in the form illustrated the wires or strands making up each tendon 16 are anchored in a bearing plate 16A into which a stud 17 is screwed. In similar fashion to the studs 9, the studs 17 pass through the disc 5 in tubes 18, and through holes in a bearing plate 19 to receive, at their other ends, washers 20 and nuts 21. Between the disc 5 and the concrete of the container 2, pacing pieces 22 are provided so that the disc is held clear of the bearing plate 16A anchoring the tendons 16, and any secondary hold-down loads on the disc are transferred directly to the container concrete.

In a modified form not shown, the tendons conventionally provided and anchored in the container concrete as shown in the illustrated form are extended, utilising couplers, and these extensions pass through and are anchored in the concrete of the disc 5 in the manner conventionally utilised for anchoring the tendons in the concrete of the container 2. The secondary hold-down load is applied by making-good the anchorages in the concrete of the disc 5.

In each of the forms so far described both the primary and the secondary hold-down load can be removed, to enable the disc 5 to be removed, without removing the prestress applied to the container concrete by the tendons 16. The stress in the secondary hold-down components can be set to any desired value from zero to maximum possible.

In another modified form, also not shown, the tendons conventionally provided are not anchored in the container concrete but are, instead, made of sufficient length to pass through and be anchored, utilising conventional anchorages, to the concrete of the disc 5. In this case a plurality of packing pieces is interposed between the anchor bearing plate and the surface of the disc 5 so that packing pieces can be successively removed each time the anchorage is released for removing the disc 5 and thereby wedge grips of the anchorages are re-anchored on fresh wire or strand surfaces when the anchorages are made-good again.

Whilst in the vessels described the disc 5 is located on a surface of the container concrete, it could, of course, be fully or partially let into the container concrete.

I claim:

1. A vessel comprising a prestressed concrete container; prestressing members anchored in the material of said container to apply prestress thereto; a chamber in said container; a removable closure member also formed of concrete for said chamber; primary and secondary hold-down means for holding said closure member in its closed position; said primary hold-down means including releasable members held fast with the material of said container to hold down said closure member; said secondary hold-down means including members which pass through said closure member; retaining means mounted on said secondary hold-down means for securing said members of the secondary hold-down means relative to said closure member; and releasable couplings for coupling respective members of said secondary hold-down means to corresponding prestressing members; whereby said members of the secondary hold-down means, in holding down said closure member, serve to extend said corresponding prestressing members, which latter continue to apply the prestress to said container when said members of the primary and the secondary hold-down means are released to permit removal of said closure member.

2. The vessel as defined in claim 1, further comprising tubes in which said members of the primary hold-down means pass through the material of said closure member.

3. The vessel as defined in claim 1, further comprising a first bearing plate through which said members of the primary hold-down means pass between said closure member and a wall of said chamber.

4. The vessel as defined in claim 3, wherein said tubes are socketed at one of their ends into said first bearing plate; and further comprising a collar that surmounts the other ends of said tubes, outside said closure member, said collar having a clearance fit in a corresponding hole in a second bearing plate, whereby primary hold-down load can be applied by stressing said members of the primary hold-down means, and mounting a retaining means on said last-named members, to bear via the associated said collar, said second bearing plate and said second tubes on said first bearing plate.

5. The vessel as defined in claim 1, further comprising packing means between said closure member and a wall of said chamber, which serves to space said closure member from said prestressing members.

6. The vessel as defined in claim 5, further comprising a bearing plate said retaining means bearing on said closure member via said bearing plate.

7. The vessel as defined in claim 5, wherein said members of the secondary hold-down means are secured relative to said closure member by being anchored in the material of said closure member.

* * * * *